(12) United States Patent
Su et al.

(10) Patent No.: US 7,446,965 B2
(45) Date of Patent: Nov. 4, 2008

(54) OPTICAL FOCUSING DEVICE

(75) Inventors: Han-Wei Su, Hsinchu (TW);
Chao-Chang Hu, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 20 days.

(21) Appl. No.: 11/802,023

(22) Filed: May 18, 2007

(65) Prior Publication Data

US 2008/0174889 A1    Jul. 24, 2008

(30) Foreign Application Priority Data

Jan. 19, 2007   (TW) .............................. 96102046 A (51) Int. Cl.
*G02B 7/02* (2006.01)
(52) U.S. Cl. ...................... 359/824; 359/823
(58) Field of Classification Search ................. 359/814, 359/819–824; 396/17, 144
See application file for complete search history.

(56) References Cited

U.S. PATENT DOCUMENTS

| 5,225,941 | A | 7/1993 | Saito et al. ................... 359/824 |
| 5,706,143 | A * | 1/1998 | Hipp ........................... 359/824 |
| 6,710,950 | B2 | 3/2004 | Rouvinen et al. ............ 359/824 |
| 6,961,193 | B2 | 11/2005 | Kang et al. .................. 359/824 |
| 7,099,093 | B2 | 8/2006 | Jeong et al. .................. 359/823 |
| 2007/0183064 | A1 * | 8/2007 | Shibazaki ................... 359/819 |

* cited by examiner

*Primary Examiner*—Mohammed Hasan
(74) *Attorney, Agent, or Firm*—Birch, Stewart, Kolasch & Birch, LLP (57) ABSTRACT

This invention discloses an optical focusing device including a body, a sleeve pivotally connected to the body, a lens screwedly engaged with the sleeve, and a piezoelectric actuator fixedly disposed in the body for contacting and driving the sleeve to rotate. The body and the lens are provided with first and second guiding portions respectively for positioning and sliding, so as to drive the sleeve to rotate and thereby actuate focusing of the lens. The optical focusing device is structurally simple and configured to increase a driving force.

33 Claims, 11 Drawing Sheets

OPTICAL FOCUSING DEVICE

BACKGROUND OF THE INVENTION

1. Field of the Invention

The present invention relates to an optical lens driving technology, and more particularly, to a piezoelectrically driven optical focusing device.

2. Description of the Prior Art

Optical systems and actuators for use in cellular phones and cameras nowadays are structurally simple and small-sized to conform with the trend of miniaturization. A piezoelectric actuator has advantages, such as small size, large output, low power consumption, noiseless, and high compatibility. Hence, a piezoelectric actuator is a constituent part of a digital camera or a camera phone for driving an optical lens therein and providing the zoom-in function and zoom-out function. Therefore, a piezoelectric actuator is important to any optical systems or related products.

Figure 1:
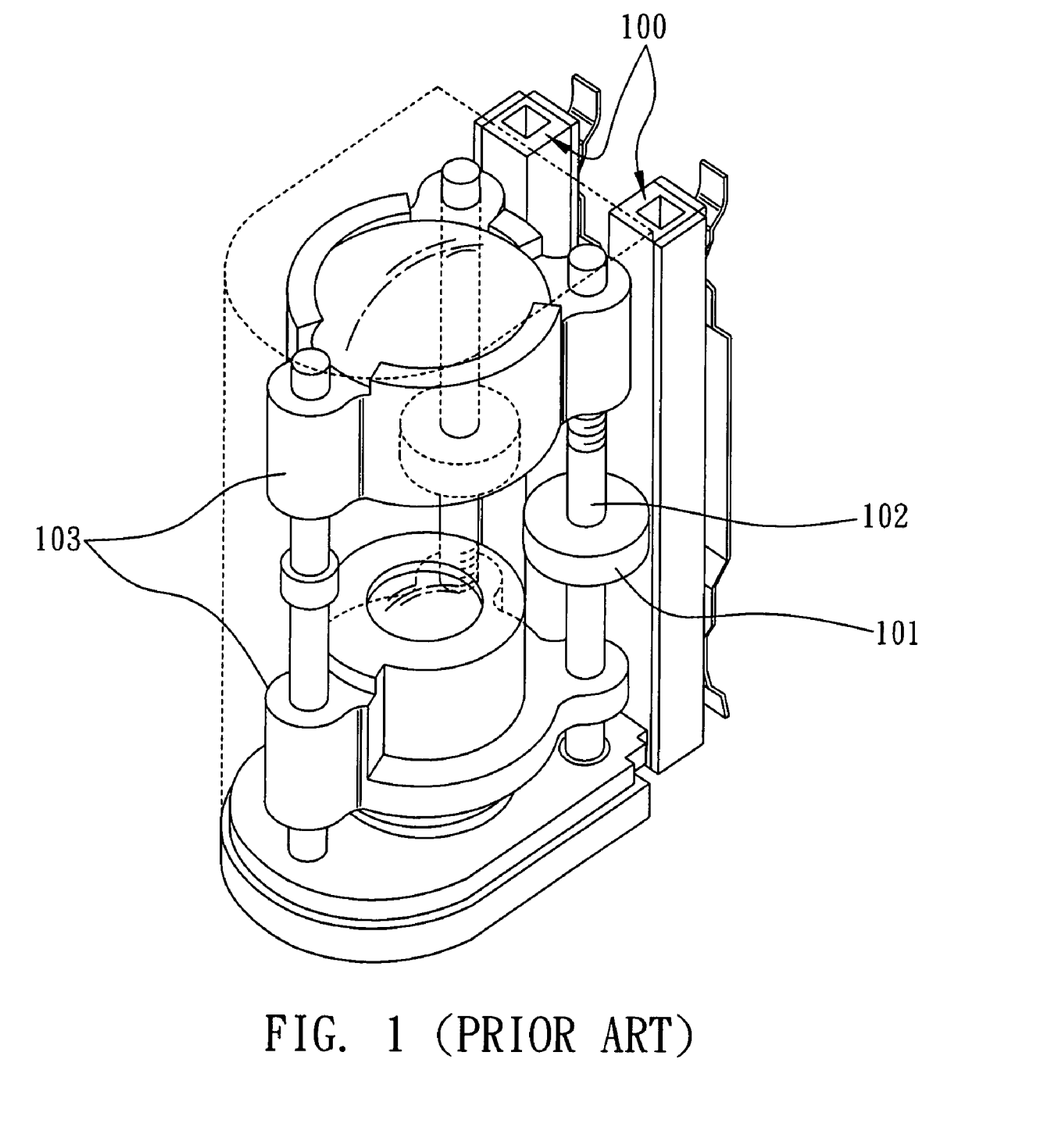
FIG. 1 (PRIOR ART) is a schematic view showing the structure of U.S. Pat. No. 7,099,093.

U.S. Pat. No. 7,099,093 disclosed a small-sized lens module as shown in FIG. 1, wherein a piezoelectric actuator 100 drives a transmission wheel 101 for positioning a rotating threaded shaft 102, thus allowing a lens 103 to move to and fro. Given the moment arm formula M=r×F, miniaturization of the transmission wheel 101 bring about a decrease of overall volume, but the piezoelectric actuator 100 has to work harder and ends up with an increase of power consumption. If the transmission wheel 101 is enlarged, the overall volume of will increase to the detriment of miniaturization.

Figure 2:
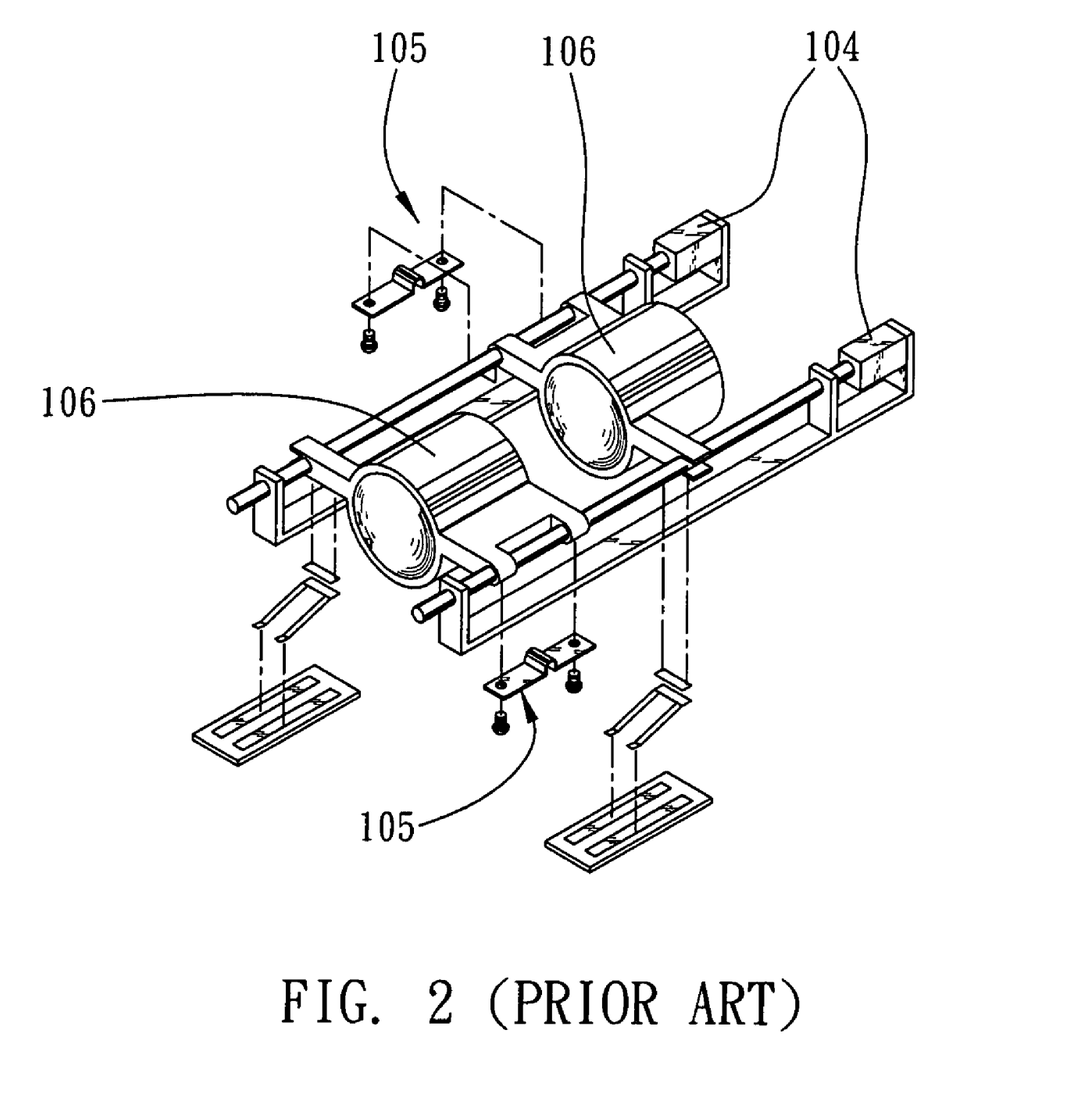
FIG. 2 (PRIOR ART) is a schematic view showing the structure of U.S. Pat. No. 5,225,941.

U.S. Pat. No. 5,225,941 disclosed a driving device as shown in FIG. 2, comprising a multilayer piezoelectric actuator 104, a leaf spring 105 for generating preload, and a lens 106, wherein an inputted driving signal causes the lens 106 to forward or backward. However, the multilayer piezoelectric actuator 104 has to comprise multilayer piezoelectric plates for the sake of considerable displacement and exertion. Accordingly, it is difficult to thin out the driving device.

Figure 3:
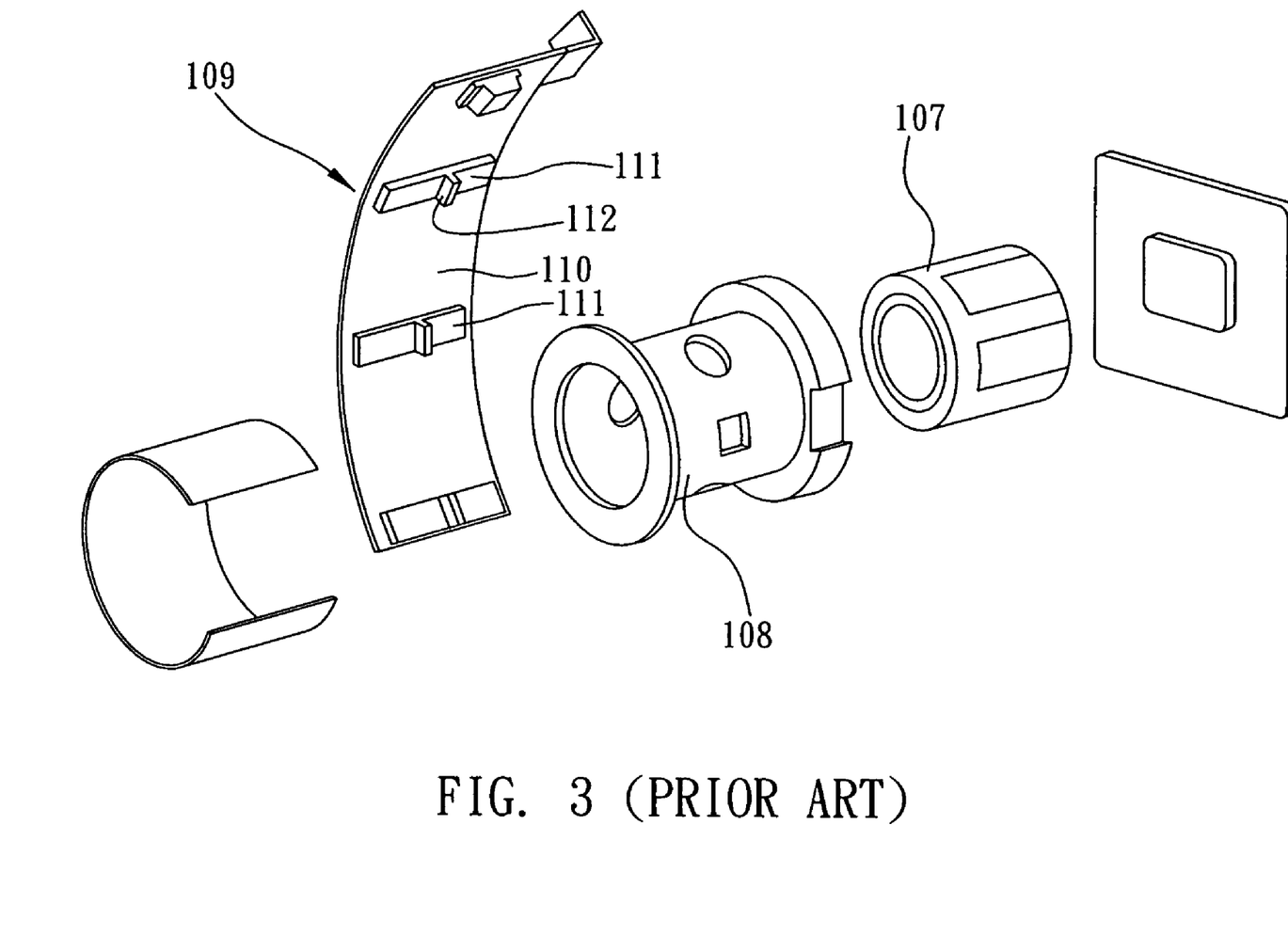
FIG. 3 (PRIOR ART) is a schematic view showing the structure of U.S. Pat. No. 6,710,950.

U.S. Pat. No. 6,710,950 disclosed a piezoelectric actuator for use in an optical system of a digital camera. As shown in FIG. 3, a piezoelectric actuator 109 is externally coupled to a sleeve 108 of a lens unit 107. The piezoelectric actuator 109 comprises a circuit board 110, a plurality of piezoelectric plates 111, and a plurality of engagement pads 112. The piezoelectric plates 111 are equidistantly spaced and formed on the inner surface of the circuit board 110. The engagement pads 112 are coupled to the piezoelectric plates 111 respectively. Applying a voltage to the piezoelectric plates 111 disposed on the outer circumferential surface of the lens unit 107 allows the piezoelectric plates 111 to generate a surface wave which, in turn, causes the engagement pads 112 to push the lens unit 107 synchronously, and in consequence the lens unit 107 undergoes axial displacement relative to the sleeve 108, thus achieving optical focusing of the digital camera. However, the piezoelectric actuator 109 disclosed in U.S. Pat. No. 6,710,950 is expensive and difficult to assemble, because of a plurality of piezoelectric elements used, not to mention that control over synchronous displacement of piezoelectric elements is unlikely to be precise. Moreover, the length of the sleeve 108 is displacement-dependent, and thus the sleeve 108 will have to be rather long to the detriment of miniaturization in pursuit of great displacement.

Figure 4:
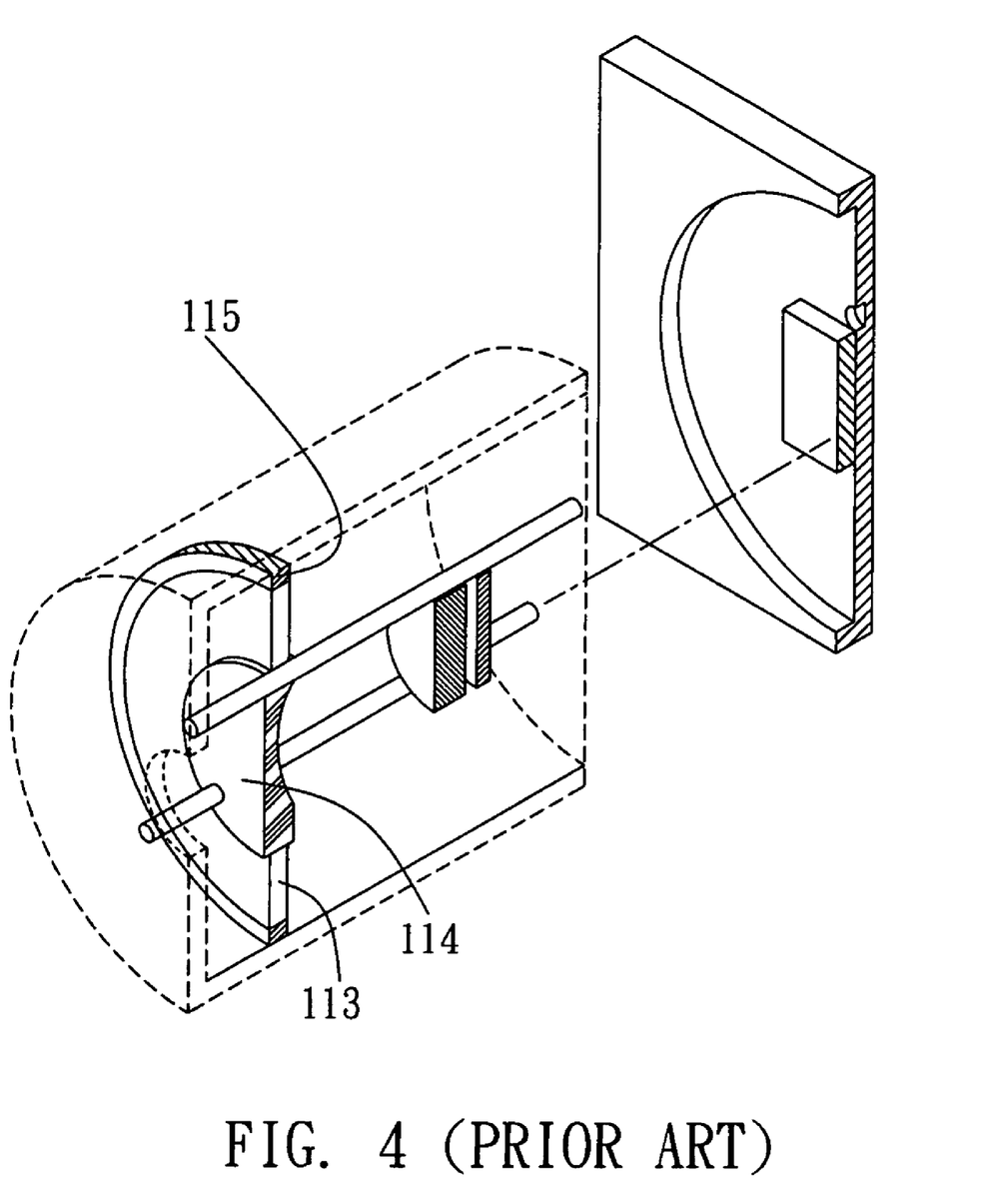
FIG. 4 (PRIOR ART) is a schematic view showing the structure of U.S. Pat. No. 6,961,193.

U.S. Pat. No. 6,961,193 disclosed a driving device for driving a lens. As shown in FIG. 4, the driving device comprises a piezoelectric plates 113, a lens 114, and a weight 115. The piezoelectric plates 113 generates an inertial force for driving the lens 114 forward or backward. However, to generate the inertial force, the piezoelectric plates 113 has to be outwardly provided with the weight 115, thus increasing the diameter and mass of the driving device.

Accordingly, an issue calling for an urgent solution involves developing an optical focusing device having advantages, such as great driving torque, small size, structurally simple constituent components, well-built structure, easy to fabricate, and convenient to assemble, with a view to solving the existing drawbacks of the prior art.

SUMMARY OF THE INVENTION

In light of the aforesaid drawbacks of the prior art, it is a primary objective of the present invention to provide an optical focusing device equipped with structurally simple constituent components.

Another objective of the present invention is to provide an optical focusing device conducive to reduction of volume.

Yet another objective of the present invention is to provide an optical focusing device for enhancing driving torque.

A further objective of the present invention is to provide an optical focusing device structurally well built.

A further objective of the present invention is to provide an optical focusing device easy to fabricate.

A further objective of the present invention is to provide an optical focusing device easy to assemble.

In order to achieve the above and other objectives, the present invention provides an optical focusing device, comprising: a body having first and second receiving spaces adjoining one another, an aperture allowing the first receiving space to communicate with the outside, first guiding portions adjoining the first receiving space, and a pivot portion positioned in the second receiving space; a sleeve pivotally connected to the pivot portion in the second receiving space and formed with a first screwing portion; a lens disposed in the first receiving space, formed with a second screwing portion for screwed engagement with the first screwing portion, provided with second guiding portions slidable to and secured in position to the first guiding portions, and moved axially in response to rotation of the sleeve; and a piezoelectric actuator fixed to the body, touching the outer surface of the sleeve, generating a rotational force for rotating the sleeve and making the lens focus.

Regarding the optical focusing device, the axis of the piezoelectric actuator is parallel to that of the sleeve, and the piezoelectric actuator comprises one metal tube and two piezoelectric plates. The two piezoelectric plates are spaced apart from one another and mounted on the outer surface of the metal tube. The metal tube is made of aluminum or copper (brass, for example) and can, optionally, be replaced with a ceramic or plastic tube. The piezoelectric plates are either monolayer or multiplayer, and are subjected to polarization distribution, electrode coating, or cutting, depending on a vibration mode and shape.

The body is formed with two opposing fixing holes for fixing the two ends of the piezoelectric actuator in position. The pivot portion of the body comprises a protruding ring and rolling elements. The protruding ring is positioned inside the body and is concentric with the aperture. The rolling elements are disposed between the protruding ring and the sleeve. In a preferred embodiment, the rolling elements are collectively implemented as a rolling bearing, such as a ball bearing, a needle bearing, and a roller bearing. In another preferred embodiment, the rolling elements comprise a plurality of balls. The inner circumferential surface of the protruding ring is formed with a plurality of grooves for securing the balls in position. The grooves are isogonally formed at the inner circumferential surface of the protruding ring. The grooves penetrate the body so as to reach the outside thereof, and is sealed by an annular seal.

A pressing portion is disposed on at least one side of the body for pressing on the piezoelectric actuator, so as to provide preload for the piezoelectric actuator to touch the outer surface of the sleeve. In yet another preferred embodiment, the pressing portion comprises a preload adjustment element, such as a screw, coupled to one side of the body and abutting against the outer surface of the piezoelectric actuator. Preferably, the pressing portion further comprises a resilient element disposed between the preload adjustment element and the piezoelectric actuator. The resilient element is implemented as a spring, a leaf spring, or a rubber pad. In still yet another preferred embodiment, the pressing portion comprises a lid coupled to one side of the body and a resilient element disposed between the lid and the piezoelectric actuator. The resilient element is implemented as a spring, a leaf spring, or a rubber pad. The body comprises a base and a housing coupled thereto. The housing is provided with the first and second receiving spaces adjoining one another, the aperture allowing the first receiving space to communicate with the outside, and the first guiding portions adjoining the first receiving space. The base is provided with a pivot portion positioned in the second receiving space.

Regarding the optical focusing device, a friction portion is formed on the outer surface of the sleeve for being touched and driven by the piezoelectric actuator. The friction portion is an annular structure formed on the outer surface of the sleeve to encircle the sleeve. The annular structure is made of a metal, rubber, or a wearproof material. In still yet another preferred embodiment, the friction portion is a coating layer on the outer surface of the sleeve, and the coating layer is made of Teflon, aluminum oxide, zirconium oxide, boron oxide, or a wearproof mixture. The body can also comprise a plurality of piezoelectric actuators touching the outer surface of the sleeve, and preferably the piezoelectric actuators are isogonally mounted on the outer surface of the sleeve.

The first screwing portion formed in the sleeve is implemented as an internal thread, and the second screwing portion formed in the lens is implemented as an internal thread. In a preferred embodiment, the first guiding portions are implemented as tracks formed inside the body and adjoining the first receiving space, and the second guiding portions are implemented as bumps formed on the outer surface of the lens and slidable to the tracks. Preferably, a sleeve mating element is secured in position to the outside of the lens, and the bumps are formed on the outer surface of the sleeve mating element. In another preferred embodiment, the first guiding portions are implemented as bumps formed inside the body and adjoining the first receiving space, and the second guiding portions are implemented as tracks formed on the outer surface of the lens and slidable to the bumps. Likewise, a sleeve mating element is secured in position to the outside of the lens, and the tracks are formed on the outer surface of the sleeve mating element.

Unlike the prior art, the present invention discloses driving a plurality of piezoelectric actuators concurrently so as to enhance the driving torque. The present invention achieves miniaturization, and therefore is applicable to electronic devices like cellular phones, in that focusing of a lens unit occurs by means of a single piezoelectric actuator or a plurality of piezoelectric actuators. The body, lens, sleeve, and piezoelectric actuator of the present invention are structurally simple components, each of which are standardized or fabricated in the form of an integral single piece, thereby meeting the requirements for simplicity, strength, ease of fabrication. The constituent components disclosed in the present invention are provided with positioning areas or joint areas and therefore are easy to assemble. Accordingly, the present invention solves the drawbacks of the prior art and therefore has high industrial applicability.

DETAILED DESCRIPTION OF THE PREFERRED EMBODIMENTS

The following specific embodiments are provided to illustrate the present invention. Persons skilled in the art can readily gain insight into other advantages and features of the present invention based on the contents disclosed in this specification.

Figure 5:
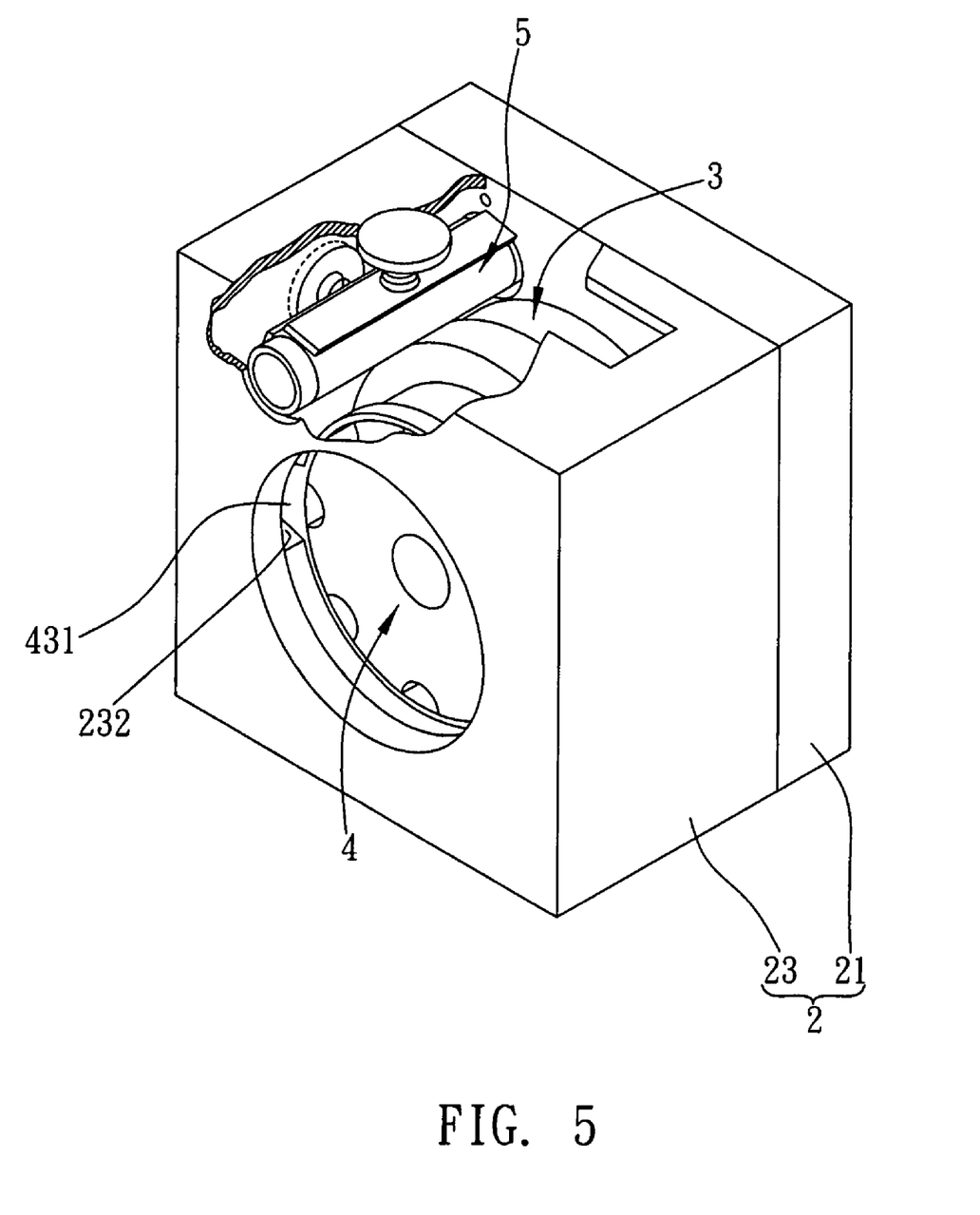
FIG. 5 is a schematic view showing the first embodiment of an optical focusing device of the present invention.

Referring to FIG. 5, which is a schematic view showing the first embodiment of an optical focusing device of the present invention, an optical focusing device of the present invention comprises: a body 2, a sleeve 3 pivotally connected to the body 2, a lens 4 in screwed engagement with the sleeve 3, and a piezoelectric actuator 5 fixed to the body 2 and contactually driving the sleeve 3 to rotate. The body 2 and the lens 4 are provided with first guiding portions 232 and second guiding portions 431 respectively for being positioned and slided relative to one another. The piezoelectric actuator 5 drives the sleeve 3 to rotate and thereby allows the lens 4 to focus. The optical focusing device comprises structurally simple constituent components, enhances the driving force, and overcomes the drawbacks of the prior art.

In this preferred embodiment, the axis of the piezoelectric actuator 5 is parallel to that of the sleeve 3 for the sake of efficient driving and maximum torque. However, miniaturization can be achieved at the cost of the aforesaid parallel configuration. Under fixed voltage, the piezoelectric actuator 5 can be driven at single-phase resonance frequency (single frequency, single phase) or dual-phase resonance frequency (single frequency, different phases). In practice, voltage is applied by means of wiring or external pins, depending on the products involved. Methods of wiring or external pins can be readily apprehended and implemented by persons of ordinary skill in the art and therefore are not recited in this preferred embodiment.

Figure 6A:
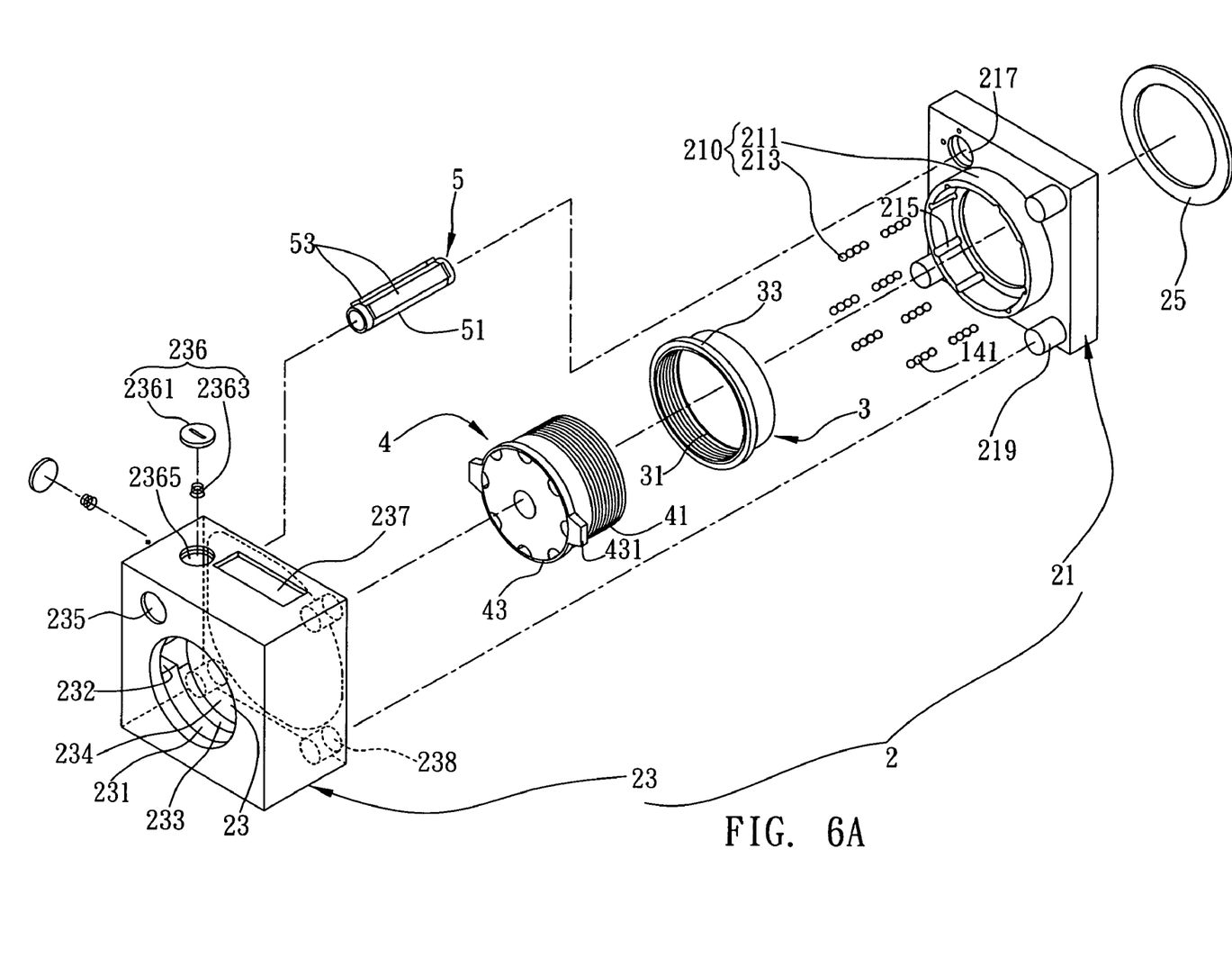
FIG. 6A is an exploded view showing the first embodiment of an optical focusing device of the present invention.

As shown in FIGS. 5 and 6, the body 2 has first and second receiving spaces 231 and 233 adjoining one another, an aperture 234 allowing the first receiving space 231 to communicate with the outside, first guiding portions 232 adjoining the first receiving space 231, and a pivot portion 210 positioned in the second receiving space 233. In this preferred embodiment, the body 2 comprises a base 21 and a housing 23 coupled thereto. The housing 23 is provided with the first and second receiving spaces 231 and 233 adjoining one another, the aperture 234 allowing the first receiving space 231 to communicate with the outside, and the first guiding portions 232 adjoining the first receiving space 231. The base 21 is provided with a pivot portion 210 positioned in the second receiving space 233.

Figure 6B:
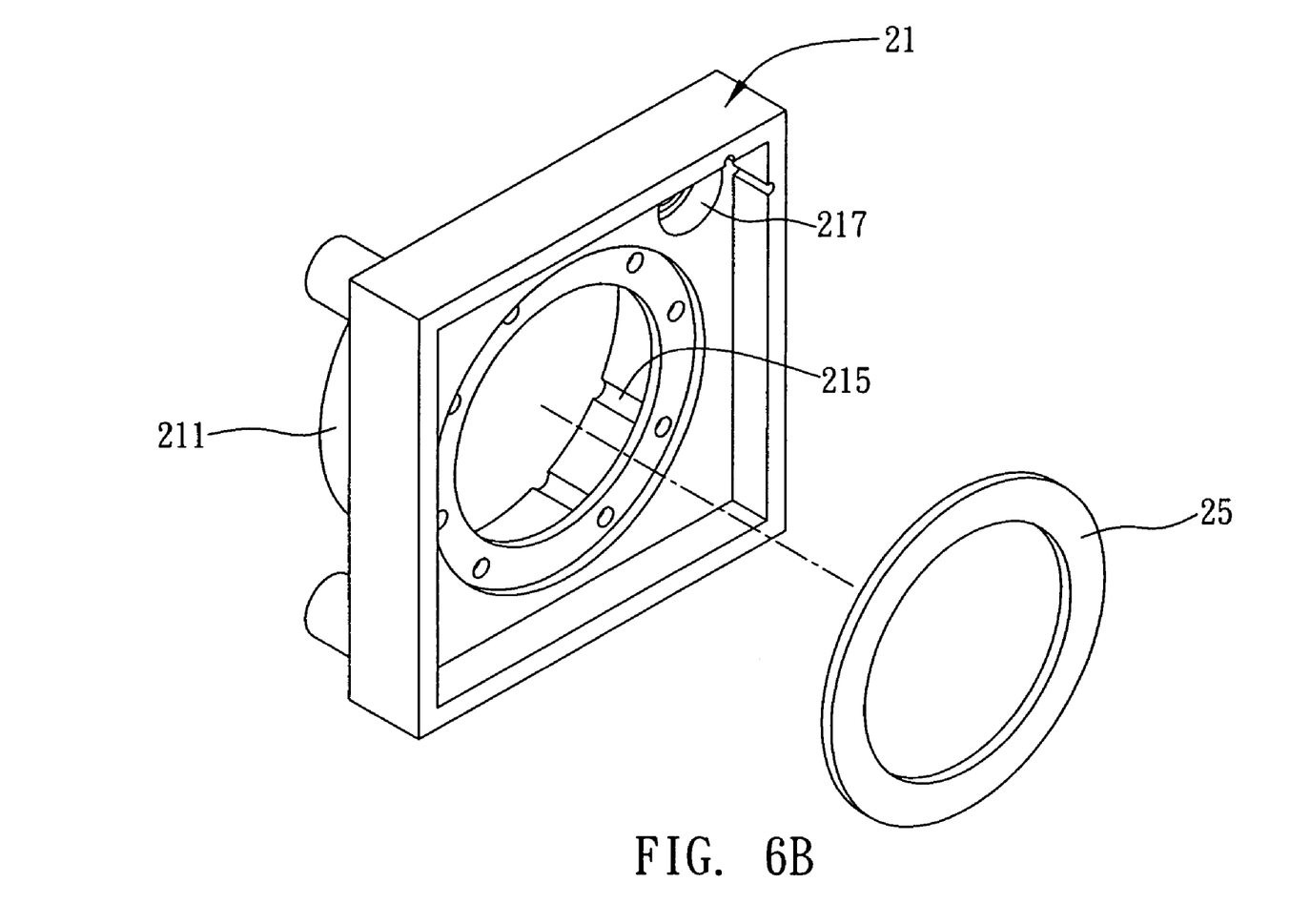
FIG. 6B is a schematic view showing the base of the first embodiment of an optical focusing device of the present invention.

Referring to FIGS. 6A and 6B, upon engagement with the housing 23, the base 21 is provided with a pivot portion 210 positioned in the second receiving space 233, such that not only is the pivot portion 210 pivotally connected to the sleeve 3, but the pivot portion 210 prevents the sleeve 3 from moving axially. In this preferred embodiment, the pivot portion 210 comprises a protruding ring 211 and rolling elements 213. The protruding ring 211 is inside the body 2 and is concentric with the aperture 234. The rolling elements 213 are disposed between the protruding ring 211 and the sleeve 3. The rolling elements 213 are collectively a plurality of balls, for example. A plurality of grooves 215 are formed at the inner circumferential surface of the protruding ring 211 for securing the balls in position. The grooves 215 are isogonally formed at the inner circumferential surface of the protruding ring 211. The grooves 215 penetrate the base 21 so as to reach the outside thereof, and is sealed by an annular seal 25. A fixing hole 217 is formed at a corner of the base 21 for fixing the piezoelectric actuator 5 to the base 21.

Figure 6C:
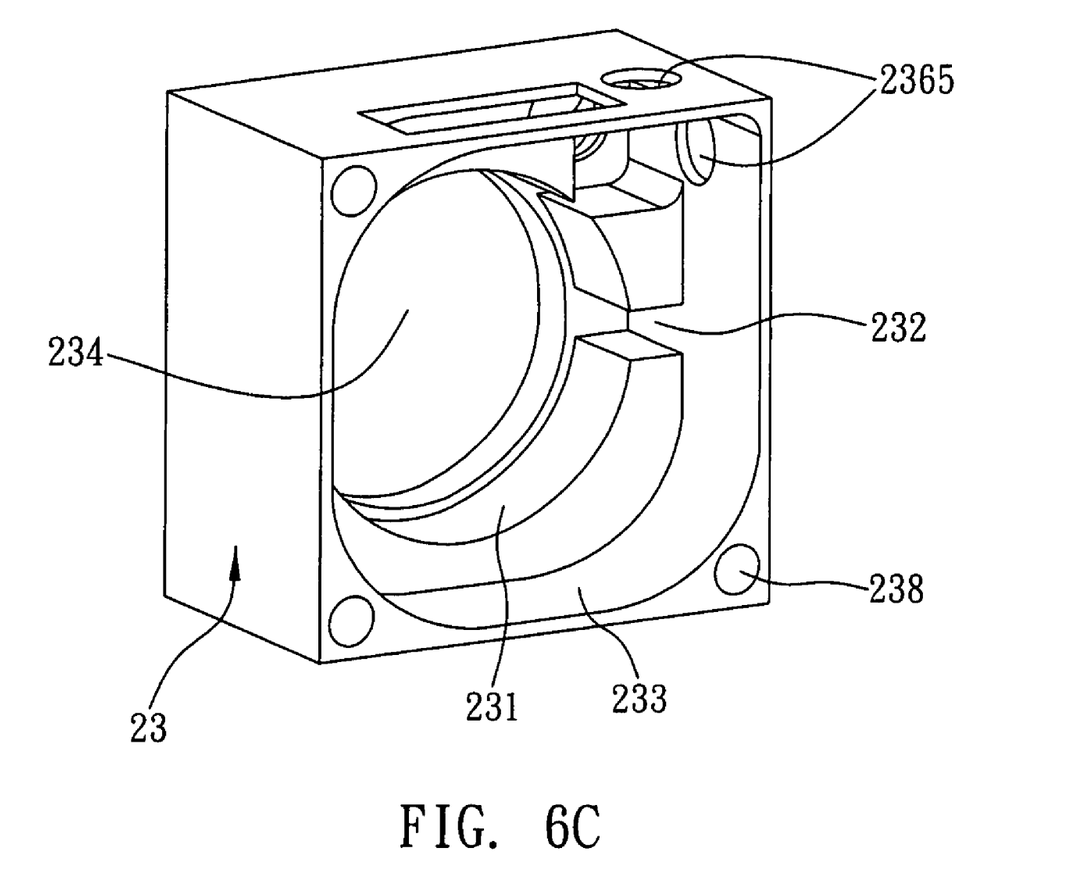
FIG. 6C is a schematic view showing the housing of the first embodiment of an optical focusing device of the present invention.

Referring to FIGS. 6A and 6C, the housing 23 is provided with the first and second receiving spaces 231 and 233 adjoining one another and being concentric with the aperture 234. In this preferred embodiment, the first receiving space 231 is slightly larger than the aperture 234 so as to receive the lens 4, and provides rooms for axial movement required for focusing the lens 4 along with the second receiving space 233. The first guiding portions 232 are tracks formed inside the housing 23 and corresponding in position to two sides of the first receiving space 231. The housing 23 is formed with a fixing hole 235 corresponding in position to the aforesaid fixing hole 217. The fixing holes 217 and 235 formed in the base 21 and the housing 23 respectively fix the two ends of the piezoelectric actuator 5 in position, thus providing the optimal fixed boundary condition for the piezoelectric actuator 5. In addition, positioning portions 219 and 238 are respectively formed in the base 21 and housing 23 for engagement thereof.

The base 21 and housing 23 together constitute the modularized body 2 when fastened or glued to one another. In this preferred embodiment, the base 21 and housing 23 that constitute the body 2 can be replaced with any other equivalent components for the sake of simplicity and ease of fabrication. The replacement is comprehensible to and achievable by persons of ordinary skill in the art and therefore is not reiterated herein.

The sleeve 3 is pivotally connected to the pivot portion 210 in the second receiving space 233 of the body 2 and is formed with the first screwing portion 31 implemented as an internal thread. In this preferred embodiment, the pivot portion 210 comprises the protruding ring 211 and the rolling elements 213 disposed between the protruding ring 211 and the sleeve 3 and collectively implemented as a plurality of balls for example. The sleeve 3 is inserted into the protruding ring 211 and pivotally connected thereto by contact with the rolling elements 213 collectively implemented as a plurality of balls for example. A friction portion 33 is formed on the outer surface of the sleeve 3 for being touched and driven by the piezoelectric actuator 5. In this preferred embodiment, the friction portion 33 is an annular structure formed on the outer surface of the sleeve 3 to encircle the sleeve 3 and block the balls. The annular structure is made of a metal, rubber, or a wearproof material; for instance, the annular structure is a wearproof ceramic ring. In another preferred embodiment, the friction portion 33 is implemented as a coating layer on the outer surface of the sleeve 3, and the coating layer is made of Teflon, aluminum oxide, zirconium oxide, boron oxide, or a wearproof mixture. For instance, the sleeve 3 is coated with Teflon. Alternatively, for instance, the friction portion 33 implemented as the annular structure and made of one of the aforesaid materials is encirclingly mounted on the outer circumferential surface of the sleeve 3.

The lens 4 is disposed in the first receiving space 231, formed with a second screwing portion 41 for screwed engagement with the first screwing portion 31, provided with second guiding portions 431 slidable to and secured in position to the first guiding portions 232, and moved axially in response to rotation of the sleeve 3. In this preferred embodiment, the second screwing portion 41 is implemented as an external thread formed at the rear of the lens 4 for engagement with the first screwing portion 31 (implemented as the internal thread) of the sleeve 3, and the second guiding portions 431 are implemented as bumps flanking the front of the lens 4 bilaterally and corresponding in position to the first guiding portions 232 implemented as tracks, for example. A sleeve mating element 43 is secured in position to the front of the lens 4 outwardly, and the second guiding portions 431 implemented as bumps, for example, are formed on the outer surface of the sleeve mating element 43. In so doing, it is feasible to secure the sleeve mating element 43 in position to a standard lens like the lens 4, otherwise it is necessary to fabricate the lens 4 integrally formed with the second guiding portions 431. Alternatively, the first guiding portions 232 are implemented as bumps formed inside the body 2 and adjoining the first receiving space 231, and the second guiding portions 431 are implemented as tracks formed on the outer surface of the lens 4 and slidable to the bumps. Likewise, the sleeve mating element 43 is secured in position to the outside of the lens 4, and the tracks are formed on the outer surface of the sleeve mating element 43.

Figure 7A:
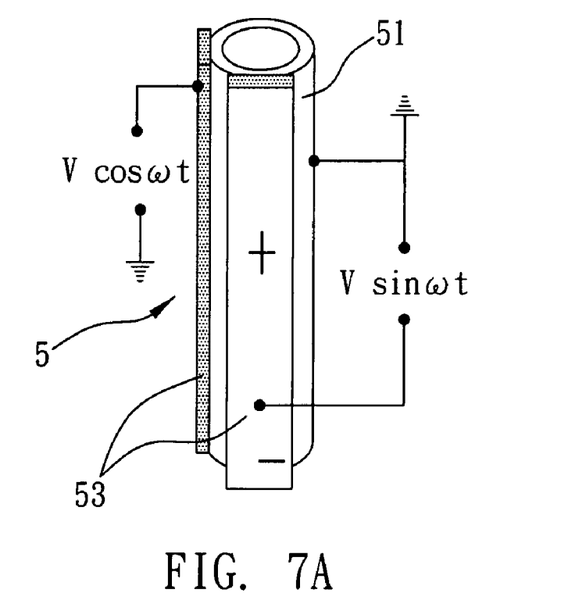
FIGS. 7A to 7D are schematic views showing four embodiments of an piezoelectric actuator used in an optical focusing device of the present invention.
Figure 7B:
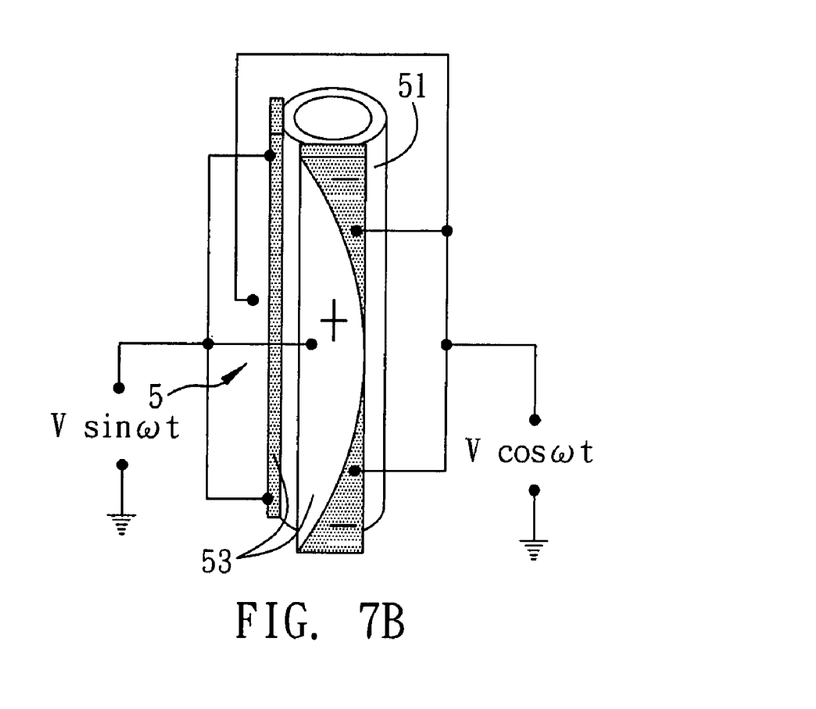
Figure 7C:
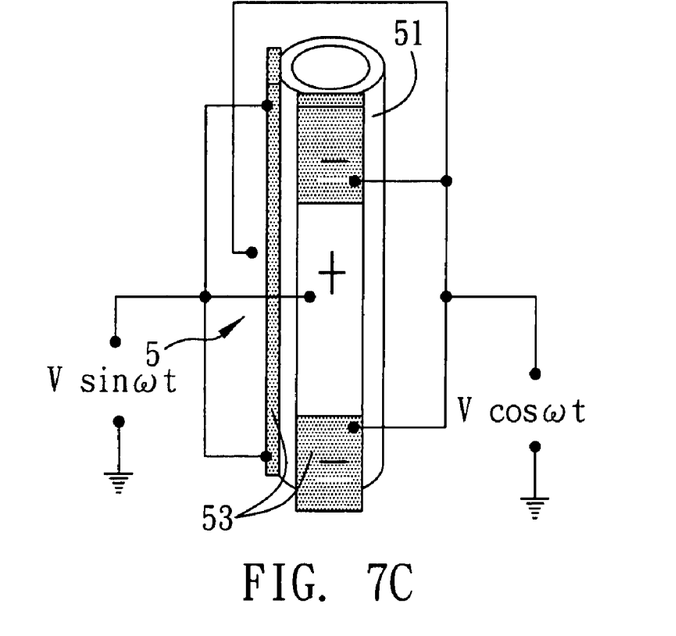
Figure 7D:
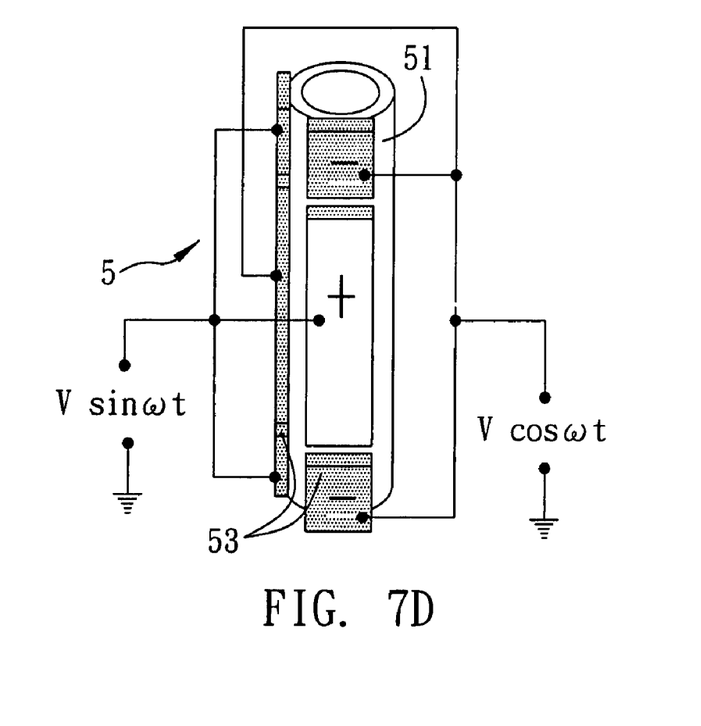

The piezoelectric actuator 5 is secured in position to the body 2 and touches the outer surface of the sleeve 3, in a node-dependent manner, so as to generate the rotational force for rotating the sleeve 3 and making the lens 4 focus. The two ends of the piezoelectric actuator 5 are inserted into and secured in position to the fixing holes 217 and 235 formed in the base 21 and housing 23 respectively. Referring to FIG. 7A, the piezoelectric actuator 5 comprises one metal tube 51 and two piezoelectric plates 53. The metal tube 51 is made of aluminum or copper (brass, for example). Alternatively, the metal tube 51 is replaced with a plastic tube. The two piezoelectric plates 53 are fixedly mounted on the outer surface of the metal tube 51 and spaced apart from one another with an included angle of 90°, for example. The piezoelectric plates 53 are monolayer or multilayer. The piezoelectric plates 53 are subjected to one selected from the group consisting of polarization distribution, electrode coating, and cutting, depending on a vibration mode and shape. In the embodiment shown in FIG. 7B, electrode coating is performed on the surface of the piezoelectric plates 53 for attaining the preferred vibration mode. In the embodiment shown in FIG. 7C, polarization is performed on the surface of the piezoelectric plates 53 for attaining the preferred vibration mode. In the embodiment shown in FIG. 7D, matching is performed on the surface of the piezoelectric plates 53 for attaining the preferred vibration mode.

The metal tube 51 is connected to the negative pole of an applied electrical field and the two piezoelectric plates 53 to two positive poles of the applied electrical field respectively. Applying voltage to one of the two piezoelectric plates 53 causes the piezoelectric actuator 5 to acquire the mechanical energy required for high-frequency swing due to reverse piezoelectric effect and thereby undergo anticlockwise hula hoop-like circular motion. Conversely, applying voltage to the other one of the two piezoelectric plates 53 causes the piezoelectric actuator 5 to acquire the mechanical energy required for high-frequency swing due to reverse piezoelectric effect and thereby undergo clockwise hula hoop-like circular motion. In so doing, the sleeve 3 is driven to rotate anticlockwise and clockwise.

Referring to FIGS. 7A to 7D, the piezoelectric actuator 5 can be driven at single-frequency single-phase mode (for example, $V \sin \omega t$ or $V \cos \omega t$), single-frequency dual-phase mode (for example, $V \sin \omega t$ and $V \cos \omega t$), or dual-frequency mode (for example, $V \sin \omega_1 t$ and $V \sin \omega_2 t$, or $V \cos \omega_1 t$ and $V \cos \omega_2 t$, where $w_1 \neq \omega_2$). Alternatively, the piezoelectric actuator 5 can be driven at square-wave voltage or serrate-wave voltage, as opposed to sine-wave voltage recited in this preferred embodiment.

A pressing portion 236 is disposed on at least one side of the body 2 for pressing on the piezoelectric actuator 5, so as to provide preload for the piezoelectric actuator 5 to touch the outer surface of the sleeve 3. In this preferred embodiment, two adjacent sides of the housing 23 of the body 2 are each formed with the pressing portion 236. The pressing portion 236 comprises a lid 2361 and a resilient element 2363. The lid 2361 is coupled to one side of the housing 23. The resilient element 2363 is disposed between the lid 2361 and the piezoelectric actuator 5. The lid 2361 adhesively seals a through-hole 2365 formed in the housing 23 beforehand. The lid 2361 abuts against the resilient element 2363 such that the resilient element 2363 resiliently stretches out between the lid 2361 and the piezoelectric actuator 5. The resilient element 2363 is a spring, a leaf spring, or a rubber pad. In this preferred embodiment, an appropriate degree of preload is provided by a compression spring of appropriate elastic coefficient, though in other preferred embodiments the pressing portion 236 can comprise a preload adjustment element, such as a screw, coupled to one side of the body 2 and abutting against the outer surface of the piezoelectric actuator 5, such that the preload exerted on the outer surface of the piezoelectric actuator 5 by the preload adjustment element is adjusted, using a torque wrench. Also, it is feasible to have the resilient element 2363 positioned between the preload adjustment element and the piezoelectric actuator 5. Moreover, a window 237 is formed at the outer surface of the housing 23 of the body 2 for observing rotation conditions of the sleeve 3. However, in practice, the window 237 is not necessarily a constituent component of a modularized product.

The pivot portion 210 allows the sleeve 3 to be rotated and positioned in the second receiving space 233 of the body 2. The first guiding portions 232 and second guiding portions 431 together allow the lens 4 screwedly engaged with the sleeve 3 to be slided, positioned, and stopped from rotating. The first screwing portion 31 and second screwing portion 41 together allow the lens 4 in the sleeve 3 to be moved axially only in response to rotation of the sleeve 3. Applying voltage to the piezoelectric actuator 5 causes the piezoelectric actuator 5 to undergo hula hoop-like circular motion, and then the sleeve 3 is driven to rotate in the presence of friction between the rotating piezoelectric actuator 5 and the sleeve 3 in contact therewith, thus allowing the lens 4 to be moved axially and focused.

Although this preferred embodiment recites one piezoelectric actuator 5 secured in position to the body 2, other preferred embodiments may have more than one piezoelectric actuator isogonally mounted on the outer surface of the sleeve 3 when taking into account the required driving force and speed. Rotation of the sleeve 3 will occur in the presence of a single or a plurality of piezoelectric actuators 5, provided that the single piezoelectric actuator 5 or the piezoelectric actuators 5 touch the friction portion 33 on the outer surface of the sleeve 3; in this regard, the isogonal configuration of the piezoelectric actuators 5 encirclingly mounted on the outer circumferential surface of the sleeve 3 is not a necessary condition of the rotation of the sleeve 3.

Although this preferred embodiment recites that the piezoelectric actuator 5 comprises one metal tube 51 and two piezoelectric plates 53, the piezoelectric actuator 5 referred to in the present invention can be implemented as whatever is capable of enabling hula hoop-like circular motion, such as a piezoelectric tube in wide use, wherein the piezoelectric tube comprises a tube-like piezoelectric ceramic body made of lead zirconate titanate (PZT) or electrostrictive material, and first, second, and third electrodes spaced apart from one another and positioned on the outer wall of the piezoelectric ceramic body. The first electrode is connected to the negative pole of an applied electrical field and the second and third electrodes to two positive poles of the applied electrical field respectively.

Figure 8:
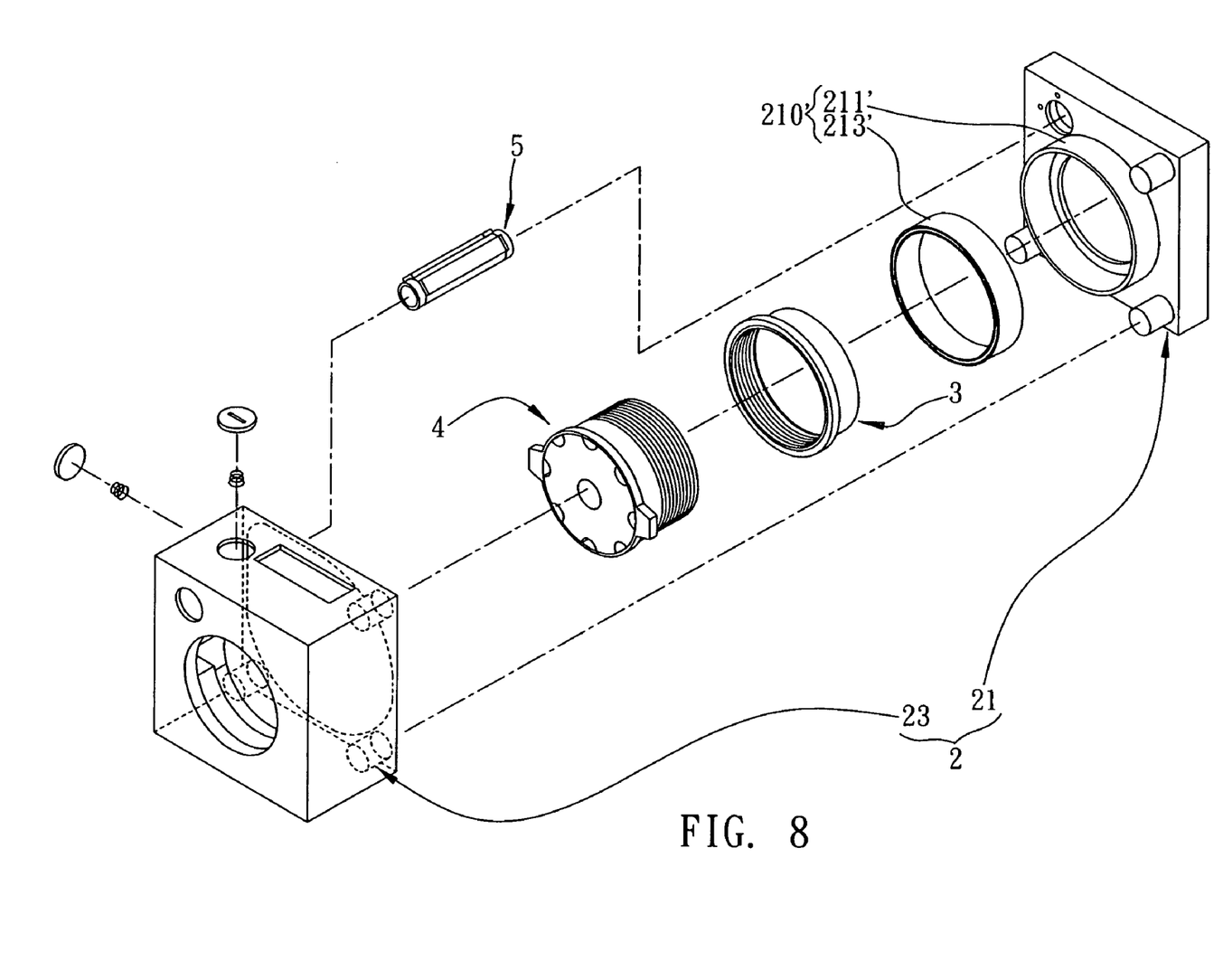
FIG. 8 is an exploded view showing the second embodiment of an optical focusing device of the present invention.

In the first preferred embodiment, the rolling elements 213 are collectively implemented as a plurality of balls, and the plurality of grooves are formed at the inner circumferential surface of the protruding ring 211 for positioning and holding the balls, but other preferred embodiments may recite use of rolling bearings that substitute for the grooves 215. Referring to FIG. 8, an exploded view showing the second embodiment of an optical focusing device of the present invention, the body 2 comprising the base 21 and housing 23, the sleeve 3, the lens 4, and the piezoelectric actuator 5 remain unchanged in structure and therefore are not reiterated herein. In this preferred embodiment, the pivot portion 210' of the optical focusing device comprises the protruding ring 211' provided for the base 21 of the body 2, and the rolling elements 213' insertedly disposed between the protruding ring 211' and the sleeve 3, wherein the rolling elements 213' are collectively implemented as a rolling bearing, such as a ball bearing, a needle bearing, and a roller bearing; the sleeve 3 is pivotally connected to the body 2, by insertedly disposing the rolling elements 213', such as the rolling bearing, between the sleeve 3 and the protruding ring 211'.

In summary, the present invention discloses a piezoelectric actuator for driving an optical lens so as to provide an optical focusing device to be received in a video system, a monitoring system, an optical system, a camera, a digital camera, or a cameraphone, wherein the optical focusing device is characterized by great torque, compactness, simplicity, strength, ease of fabrication and ease of assembly, Accordingly, the present invention has high industrial applicability.

The aforesaid embodiments merely serve as the preferred embodiments of the present invention. The aforesaid embodiments should not be construed as to limit the scope of the present invention in any way. Hence, many other changes can actually be made in the present invention. It will be apparent to those skilled in the art that all equivalent modifications or changes made to the present invention, without departing from the spirit and the technical concepts disclosed by the present invention, should fall within the scope of the appended claims.

What is claimed is:

1. An optical focusing device, comprising:
   a body having first and second receiving spaces adjoining one another, an aperture allowing the first receiving space to communicate with the outside, first guiding portions adjoining the first receiving space, and a pivot portion positioned in the second receiving space;
   a sleeve pivotally connected to the pivot portion in the second receiving space and formed with a first screwing portion;
   a lens disposed in the first receiving space, formed with a second screwing portion for screwed engagement with the first screwing portion, provided with second guiding portions slidable to and secured in position to the first guiding portions, and moved axially in response to rotation of the sleeve; and
   a piezoelectric actuator fixed to the body and touching the outer surface of the sleeve, so as to generate a rotational force for rotating the sleeve and making the lens focus.

2. The optical focusing device of claim 1, wherein the piezoelectric actuator comprises one metal tube and two piezoelectric plates.

3. The optical focusing device of claim 2, wherein the two piezoelectric plates are spaced apart from one another and fixedly mounted on the outer surface of the metal tube.

4. The optical focusing device of claim 2, wherein the piezoelectric plates are one of monolayer and multilayer.

5. The optical focusing device of claim 2, wherein the piezoelectric plates are subjected to one selected from the group consisting of polarization distribution, electrode coating, and cutting, depending on a vibration mode and shape.

6. The optical focusing device of claim 1, wherein the first screwing portion is an internal thread, and the second screwing portion is an external thread.

7. The optical focusing device of claim 1, wherein a friction portion is formed on the outer surface of the sleeve for being touched and driven by the piezoelectric actuator.

8. The optical focusing device of claim 7, wherein the friction portion is an annular structure formed on the outer surface of the sleeve to encircle the sleeve.

9. The optical focusing device of claim 8, wherein the annular structure is made of one selected from the group consisting of a metal, rubber, and a wearproof material.

10. The optical focusing device of claim 7, wherein the friction portion is a coating layer on the outer surface of the sleeve.

11. The optical focusing device of claim 10, wherein the coating layer is made of one selected from the group consisting of Teflon, aluminum oxide, zirconium oxide, boron oxide, and a wearproof mixture.

12. The optical focusing device of claim 1, wherein a plurality of piezoelectric actuators touching the outer surface of the sleeve are fixed to the body.

13. The optical focusing device of claim 12, wherein the piezoelectric actuators are isogonally mounted on the outer surface of the sleeve.

14. The optical focusing device of claim 1, wherein the first guiding portions are tracks formed inside the body and adjoining the first receiving space, and the second guiding portions are bumps formed on the outer surface of the lens and slidable to the tracks.

15. The optical focusing device of claim 14, wherein a sleeve mating element is secured in position to the outside of the lens, and the bumps are formed on the outer surface of the sleeve mating element.

16. The optical focusing device of claim 1, wherein the first guiding portions are bumps formed inside the body and adjoining the first receiving space, and the second guiding portions are tracks formed on the outer surface of the lens and slidable to the bumps.

17. The optical focusing device, wherein of claim 16, wherein a sleeve mating element is secured in position to the outside of the lens, and the tracks are formed on the outer surface of the sleeve mating element.

18. The optical focusing device of claim 1, wherein the pivot portion comprises a protruding ring and rolling elements, the protruding ring being inside the body and being concentric with the aperture, the rolling elements being disposed between the protruding ring and the sleeve.

19. The optical focusing device of claim 18, wherein the rolling elements are collectively a rolling bearing.

20. The optical focusing device of claim 19, wherein the rolling bearing is one selected from the group consisting of a ball bearing, a needle bearing, and a roller bearing.

21. The optical focusing device of claim 18, wherein the rolling elements are collectively a plurality of balls, and the inner circumferential surface of the protruding ring is formed with a plurality of grooves for securing the balls in position.

22. The optical focusing device of claim 21, wherein the grooves are isogonally formed at the inner circumferential surface of the protruding ring.

23. The optical focusing device of claim 21, wherein the grooves penetrate the base so as to reach the outside thereof, and are sealed by an annular seal.

24. The optical focusing device of claim 1, wherein two fixing holes opposing one another are formed in the body for fixing the two ends of the piezoelectric actuator in position.

25. The optical focusing device of claim 1, wherein a pressing portion is disposed on at least one side of the body for pressing on the piezoelectric actuator, so as to provide preload for the piezoelectric actuator to touch the outer surface of the sleeve.

26. The optical focusing device of claim 25, wherein the pressing portion comprises a preload adjustment element coupled to one side of the body and abutting against the outer surface of the piezoelectric actuator.

27. The optical focusing device of claim 26, wherein the preload adjustment element is a screw.

28. The optical focusing device of claim 26, wherein the pressing portion further comprises a resilient element disposed between the preload adjustment element and the piezoelectric actuator.

29. The optical focusing device of claim 28, wherein the resilient element is one selected from the group consisting of a spring, a leaf spring, and a rubber pad.

30. The optical focusing device of claim 25, wherein the pressing portion comprises a lid coupled to one side of the body and a resilient element disposed between the lid and the piezoelectric actuator.

31. The optical focusing device of claim 30, wherein the resilient element is one selected from the group consisting of a spring, a leaf spring, and a rubber pad.

32. The optical focusing device of claim 1, wherein the body is formed with a window for observing rotation of the sleeve.

33. The optical focusing device of claim 1, wherein the body comprises a base and a housing coupled thereto, the housing having the first and second receiving spaces adjoining one another, the aperture allowing the first receiving space to communicate with the outside, and the first guiding portions adjoining the first receiving space, and the base having a pivot portion positioned in the second receiving space.

* * * * *